United States Patent
Wood, III

(10) Patent No.: US 7,865,174 B2
(45) Date of Patent: *Jan. 4, 2011

(54) ESTABLISHING A COLLABORATIVE DOMAIN AMONG COMMUNICATION TERMINALS RESPONSIVE TO AUTHENTICATION

(75) Inventor: James Wood, III, Chamblee, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/568,281

(22) Filed: Sep. 28, 2009

(65) Prior Publication Data

US 2010/0015952 A1    Jan. 21, 2010

Related U.S. Application Data

(63) Continuation of application No. 11/449,459, filed on Jun. 8, 2006, now Pat. No. 7,620,386.

(51) Int. Cl.
*H04M 1/66* (2006.01)
*H04M 1/68* (2006.01)
*H04M 3/16* (2006.01)
*H04B 7/00* (2006.01)
*H04W 24/00* (2009.01)
*H04M 1/00* (2006.01)
*H04K 1/00* (2006.01)
*G06F 15/16* (2006.01)

(52) U.S. Cl. ............... 455/411; 455/410; 455/41.2; 455/553.1; 455/456.1; 380/247; 709/203; 709/205; 709/227

(58) Field of Classification Search ............ 455/41.2, 455/553.1, 414.2, 456.1, 456.2, 456.5, 456.6, 455/566, 556.1, 557, 558, 410, 411; 380/247, 380/248, 249, 250; 709/203, 205, 227
See application file for complete search history.

(56) References Cited

U.S. PATENT DOCUMENTS

| | | |
|---|---|---|
| 6,650,902 B1 | 11/2003 | Richton |
| 6,987,976 B2 | 1/2006 | Kohar et al. |
| 7,403,793 B2 | 7/2008 | Mauney et al. |
| 7,418,268 B1 | 8/2008 | Cabano et al. |

*Primary Examiner*—Un C Cho
(74) *Attorney, Agent, or Firm*—Myers Bigel Sibley & Sajovec, P.A.

(57) ABSTRACT

A method of establishing a collaborative domain among a plurality of communication terminals can include having a communication terminal authenticate one or more other communication terminals based on personal information, which can be stored on a removable memory card in the other terminals, and/or based on the geographic location of the other terminals. A first communication terminal can determine the geographic location of a second communication terminal and can authenticate the second communication terminal in response to both the determined geographic location and personal information defined in the second communication terminal. In response to the authentication by the first communication terminal, communication of user and/or program information, which is unrelated to authentication, is allowed between at least the first and second communication terminals.

17 Claims, 5 Drawing Sheets

ESTABLISHING A COLLABORATIVE DOMAIN AMONG COMMUNICATION TERMINALS RESPONSIVE TO AUTHENTICATION

RELATED APPLICATION

This application is a continuation of U.S. patent application Ser. No. 11/449,459, filed Jun. 8, 2006 now U.S. Pat. No. 7,620,386, the disclosure of which is hereby incorporated herein by reference as if set forth in its entirety.

FIELD OF THE INVENTION

The present invention relates to electronic devices and, more particularly, to enabling communication among a plurality of communication devices.

BACKGROUND OF THE INVENTION

There has been a proliferation of features in the field of communication terminals. Communication terminals, such as tablet personal computers (PCs), palmtop PCs, personal data assistants (PDAs), cellular phones, and pagers are becoming more commonplace. Various of these devices allow voice, text, pictures, video, data, and/or program instructions to be exchanged with other devices through wire-line and/or wireless communication interfaces.

With the proliferation of these communication terminals, a concern has arisen as to how to control which terminals can communicate with one another and what information can be exchanged.

SUMMARY OF THE INVENTION

Some embodiments of the present invention provide methods of establishing a collaborative domain among a plurality of communication terminals. A communication terminal can be authenticated by another communication terminal based on personal information, which can be stored on a removable memory card in the other terminal, and/or based on the geographic location of the other terminal.

In some further embodiments, a first communication terminal determines the geographic location of a second communication terminal and authenticates the second communication terminal in response to both the determined geographic location and personal information defined in the second communication terminal. In response to the authentication by the first communication terminal, communication of user and/or program information, which is unrelated to authentication, is allowed between at least the first and second communication terminals.

In some other embodiments, two or more communication terminals can establish a collaborative domain therebetween in response to authentication that is responsive to personal information that each terminal reads from a removable memory card therein and communicates to the other terminal (s). More particularly, a first communication terminal can read personal information from a removable memory card therein, and can communicate the personal information from the first communication terminal to the second communication terminal. The second communication terminal can authenticate the first communication terminal in response to the personal information received from the first communication terminal. The second communication terminal can read personal information from a removable memory card therein, and can communicate the personal information from the second communication terminal to the first communication terminal. The first communication terminal can authenticate the second communication terminal in response to the personal information received from the second communication terminal. Communication of user and/or program information, which is unrelated to authentication, can be selectively enabled between at least the first and second communication terminals in response to the authentication by the first and second communication terminals.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF EMBODIMENTS OF THE INVENTION

Figure 1:
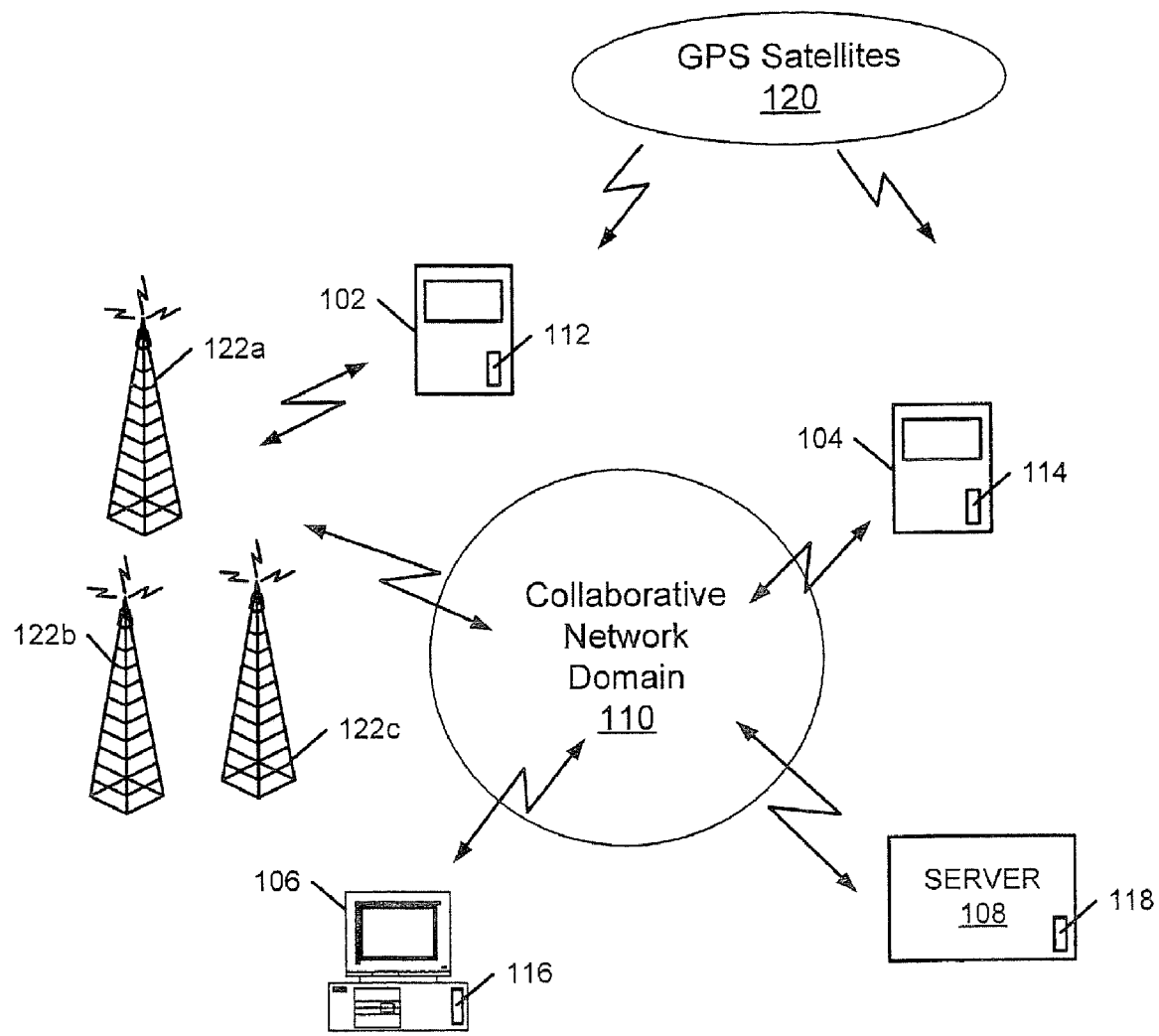
FIG. 1 is a block diagram of a communication system in which a collaborative domain is selectively established among a plurality of communication terminals in response to various authentication methods according to some embodiments of the present invention.

Specific exemplary embodiments of the present invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" and "/" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention.

Embodiments according to the present invention are described with reference to block diagrams and/or operational illustrations of methods and communication terminals. It is to be understood that each block of the block diagrams and/or operational illustrations, and combinations of blocks in the block diagrams and/or operational illustrations, can be implemented by radio frequency, analog and/or digital hardware, and/or computer program instructions. Computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "communication terminal", or "terminal" for brevity, includes, but is not limited to, an electronic device that is configured to communicate with another terminal through a wire-line connection and/or a wireless communication interface. A wireless communication terminal may communicate indirectly with another wireless communication terminal through an intervening base station transceiver and/or a wireless local area network (WLAN) router (e.g., IEEE 801.11a-g), WiFi and/or it may directly communicate with the other terminal through a WLAN interface, Bluetooth interface, another RF interface, and/or optical interface such as infra-red. Example wireless communication terminals include, but are not limited to, a cellular phone that may combine voice and data communication capabilities, and a desktop personal computer (PC), a laptop PC, a tablet PC, palmtop PC, and a personal data assistant (PDA) which include a RF/optical transceiver and associated communication capability.

In accordance with some embodiments of the present invention, a collaborative domain is established among a plurality of communication terminals in response to various authentication methods. FIG. 1 is a block diagram of a communication system in which a collaborative domain is selectively established among a plurality of communication terminals. The illustrated communication system includes the following four wireless communication terminals: two mobile wireless communication terminals 102 and 104, a personal computer 106 with wireless communication capability, and a file storage server device 108 with wireless communication capability. The terminals 102-108 can be communicatively coupled to one another to selectively establish a collaborative domain 110 through which the coupled ones of terminals 102-108 can exchange voice, text, pictures, video, data, and/or program instructions.

For example, via the collaborative domain 110, terminal 102 may load/save program data/instructions on the file server 108, and may exchange user data and/or application data/instructions with users and/or applications hosted on the other terminals 104 and 106. Users may thereby conduct group videoconferencing and/or teleconferencing using the terminals 102-106. Users may also collaboratively draw/edit graphical images which are simultaneously displayed on the terminals 102-106 (e.g., group interactive "white boarding" of user concepts), and/or collaboratively enter/edit textual/graphical documents which are simultaneously displayed on terminals 102-106 and/or stored in filter server 108. A user may begin using an application on, for example, the PC terminal 106, and may then port (transfer/copy) that application and/or redirect input/output data to another one of the terminals 102 and 104 through the collaborative domain 110. Thus, for example, a user may begin editing a document and/or watching a video broadcast on PC terminal 106 at a work place, and may then continue editing the document and/or watching the video broadcast on a mobile one of the terminals 102/104 as the user travels. The corresponding applications may be transferred from PC terminal 106 in order to be hosted by the mobile terminal 102/104, or at least part of the corresponding applications may continue to be hosted on PC terminal 106 with data input/output to/from those applications on PC terminal 106 being communicated from/to the mobile terminal 102/104.

As used herein, "user information" refers to information that a user may enter into a terminal and/or which otherwise resides in the terminal and is associated with a user. Example user information can include, but is not limited to, a user defined personal identification number, a subscriber identification number assigned to a user, a user's name, user's email address, user's messaging address, user's phone number, and/or other information defined by and/or assigned to a user. Also as used herein, "program information" refers to program data and/or instructions that may be generated by an application hosted on the terminal.

The terminals 102-108 can be selectively included in the collaborative domain 110 is response to their authentication. In some embodiments, the location of a terminal is determined and is used in combination with personal information from that terminal to authenticated that terminal. For example, PC terminal 106 can obtain personal information from mobile terminal 102 and can determine the geographic location of mobile terminal 102, and can authenticate the mobile terminal 102 in response to both the determined geographic location and the personal information. Communication of user and/or program information, which is unrelated to authentication, between the PC terminal 106 and mobile terminal 102 can be enabled in response to the authentication.

The determination of the location of a terminal can include determining whether the terminal is within a defined geographic region. For example, a terminal may be determined to be properly authenticated when it is determined to be within a geographic region defined for a user's house, work place, and/or other known location where the user is authorized and/or available for inclusion in the collaborative domain 110. Thus, the PC terminal 106 may, for example, handoff an application program, data, and/or video to the mobile terminal 102 as a user takes the mobile terminal 102 outside of a region defined for the user's work place. Alternatively, or additionally, the PC terminal 106 may, for example, handoff an application program, data, and/or video to the mobile terminal 102 only when the mobile terminal 102 is determined to be within a region defined for the user's home/work place. Thus, a user may be selectively included/excluded as part of the collaborative domain 110 in response to whether the user's terminal is determined to be within a defined geographic region. Such location based authentication may allow improved management of application licenses by restricting a defined application to being used at approved geographic locations (e.g., approved for use at a work place and home, but not elsewhere), and/or may allow improved determination of whether a user is authorized and/or available for inclusion in the collaborative domain 110 (e.g., authorized/available at the work place and home but not elsewhere).

The mobile terminals 102 and 104 may authenticate one another in response to personal information that is exchanged between the terminals 102 and 104 and in response to the determined geographic locations of the mobile terminals 102 and 104. Thus, for example, mobile terminal 102 may determine that mobile terminal 104 is properly authentic in response to personal information received from mobile terminal 104 and in response to the determined geographic location of mobile terminal 104. Mobile terminal 104 may similarly authenticate mobile terminal 102 in response to the personal information and location of mobile terminal 102. Communication of user and/or program information may be selectively enabled in response to both the authentication of mobile terminal 104 by mobile terminal 102 and the authentication of mobile terminal 102 by mobile terminal 104.

The geographic location of one or more of the terminals 102-108 may be determined based on triangulation of GPS signals received from a constellation of GPS satellites 120. Their geographic locations may alternatively, or additionally, be determined by triangulation of communication signals received from a plurality of base station transceivers 122a-c (i.e., terminal based location determination), such as from cellular base station transceivers, and/or by triangulation of communication signals received by the base station transceivers 122a-c from corresponding ones of the mobile terminals 102-108 (i.e., base station based location determination). The terminals 102-108 may then communicate their respective geographic locations to one another along with their respective personal information to allow their authentication by the other terminals.

The authentication of one terminal by another terminal can include determining whether the terminals are within a defined geographic range of one another. For example, server terminal 108 may compare the signal strength of a communication signal that is received from mobile terminal 102 to at least one threshold value as part of the authentication of the mobile terminal 102 by the server terminal 108. Alternatively, or additionally, the server terminal 108 may attempt to sense the presence of the mobile terminal 102 through an attempted direct point-to-point wireless communication interface between the terminals 108 and 102. Thus, for example, the server terminal 108 and mobile terminal 102 may exchange personal information through an indirect communication that includes at least one intervening base station transceiver, such a cellular base station, and then one or both terminals 108 and 102 may attempt to sense the presence of the other terminal through a direct point-to-point wireless communication, such as through a WLAN and/or Bluetooth device discovery protocol. The server terminal 108 may authenticate the mobile terminal 102 in response to the personal information received from terminal 102 and the determination of whether the terminals 108 and 102 are within a defined geographic range of one another.

Accordingly, for example, the mobile terminal 102 may be determined to be properly authenticated when it is determined to be no more than a defined range from the server terminal 108 (e.g., within a defined range of a work place), and may be authorized to access data and/or programs on the server terminal 108 in response to that authentication. Alternatively, for example, the mobile terminal 102 may be determined to be properly authenticated when it is determined to be greater than a defined range from the server terminal 108 (e.g., not within a defined range of a work place). In this manner, a user may be able to use a mobile terminal 102 to access/store application programs and/or data on the server terminal 102 only while the user is at work, or only while the user is at least a defined range away from work. Such selectively geographic range based authentication may be useful for satisfying some software license agreements that allow limited copying of programs for exclusive use at a licensed location or away from a licensed location. Moreover, a user may be selectively included/excluded as part of the collaborative domain 110 in response to whether the user's terminal is determined to be within a defined geographic range of one or more other terminals.

Figure 2:
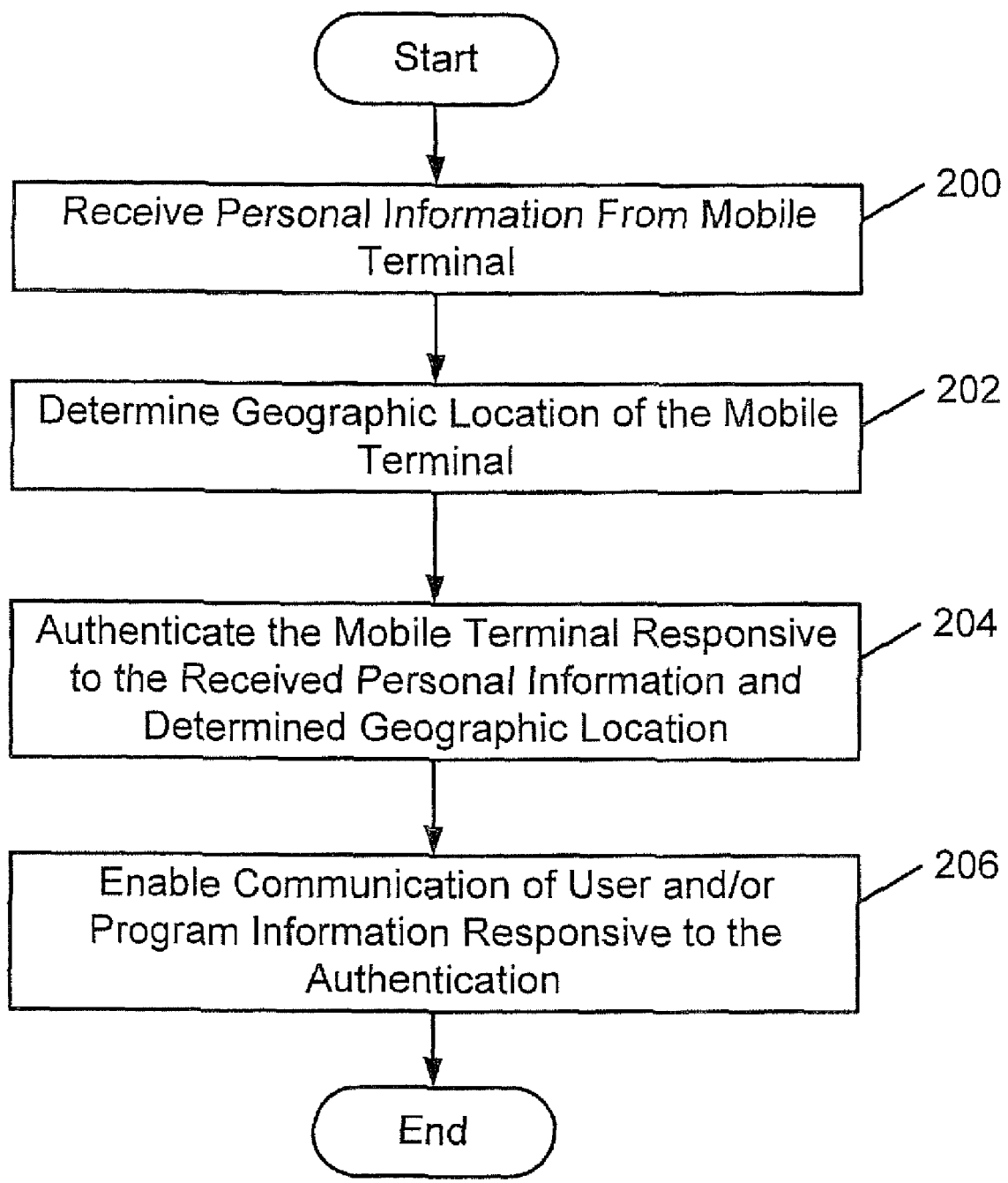
FIG. 2 is a flow chart that illustrates methods of establishing a collaborative domain among a plurality of communication terminals in response to authentication based on personal information and geographic location of one or more of the terminals according to some embodiments of the present invention.

FIG. 2 is a flow chart that illustrates methods of establishing a collaborative domain among two or more communication terminals, such as terminals 102-108, in response to authentication based on personal information and geographic location of one or more of the terminals according to some embodiments of the present invention. Personal information is received (Block 200) at a terminal from a mobile terminal. The geographic location of the mobile terminal is determined (Block 202). The mobile terminal is authenticated (Block 204) in response to the received personal information and the determined geographic location of the mobile terminal. Communication of user information and/or program information, which is unrelated to the authentication, may be enabled (Block 206) in response to the authentication.

In some other embodiments, the personal information may be stored on a removable memory card that can be at least partially inserted within one or more of the terminals 102-108. Exemplary removable memory cards 112-118 that are at least partially inserted in respective terminals 102-108 are illustrated in FIG. 1. The removable memory cards 112-118 may include, but are not limited to, a Subscriber Identify Module (SIM), a Memory Stick (including Memory Stick Duo) card, a Smart Media card, a compact flash card, Multi Media card, Secure Digital card, a Smart Card device, and/or another storage device capable of storing personal information for access by one of the terminals 102-108 into which the card is at least partially inserted.

Figure 3:
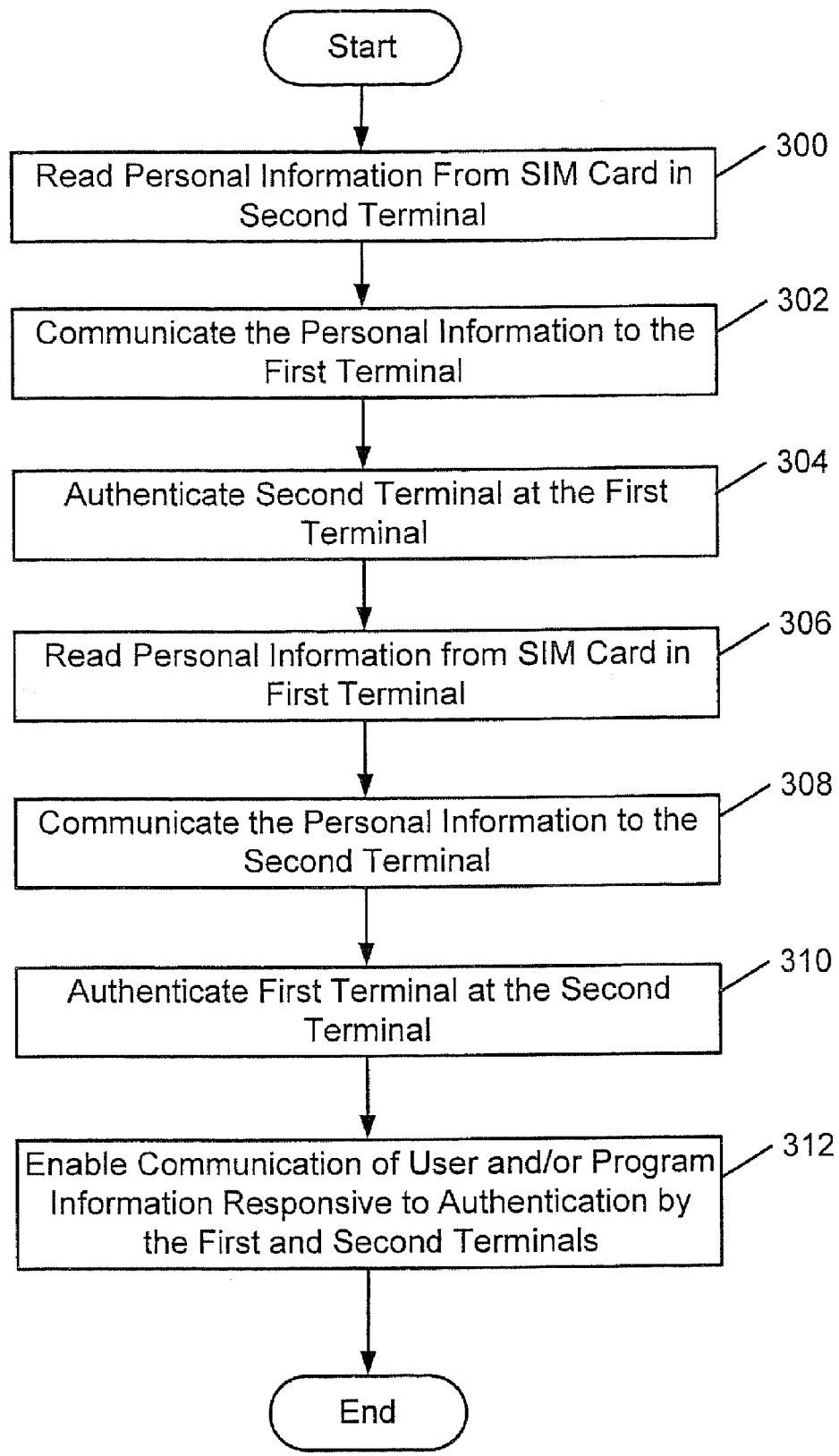
FIG. 3 is a flow chart that illustrates methods of establishing a collaborative domain among a plurality of communication terminals in response to authentication based on personal information read from a removable memory card in the communication terminals and communicated among the terminals according to some embodiments of the present invention.

FIG. 3 is a flow chart that illustrates methods of establishing a collaborative domain among a plurality of communication terminals in response to authentication based on personal information that is read from removable memory cards in two or more of the communication terminals 102-108 according to some embodiments of the present invention. A second terminal reads (Block 300) personal information from a SIM card therein, and communicates (Block 302) that personal information to a first terminal. The first terminal authenticates (Block 304) the second terminal in response to the received personal information. The first terminal reads (Block 306) personal information from a SIM card therein, and communicates (Block 308) that personal information to the second terminal. The second terminal authenticates (Block 310) the second terminal in response to the received personal information. Communication of user and/or program information is enabled (Block 312) in response to the authentications by the first and second terminals.

Thus, for example, a user may insert SIM cards, or other memory cards, into the mobile terminal 102 and PC terminal 106, the personal information on the SIM cards can be exchanged between the terminals 102 and 106 to allow authentication of one another, and a collaborative domain can be selectively established between the terminals 102 and 106 in response to the authentications. The SIM card may be a conventional SIM card which contains personal information that includes subscriber identification information which has been assigned by a wireless service provider to the user. Accordingly, a collaborative domain may be selectively established among terminals in response to personal information on a memory, such as a SIM card, which is uniquely assigned to a user. Moreover, a SIM card, which may be configured by a cellular operator for use by a subscriber in a cellular phone, can removed from that cellular phone and also used for authentication of one or more other types of terminals to enable selective access to application programs and/or data on those other terminals, such as on a desktop PC, a laptop PC, a tablet PC, palmtop PC, and/or a PDA. Thus, for example, an application program license may be tied to personal information on a SIM card, or another type of removable memory card, such that the application program may be accessed only by a terminal that has properly communicated the necessary personal information from the SIM card.

Figure 4:
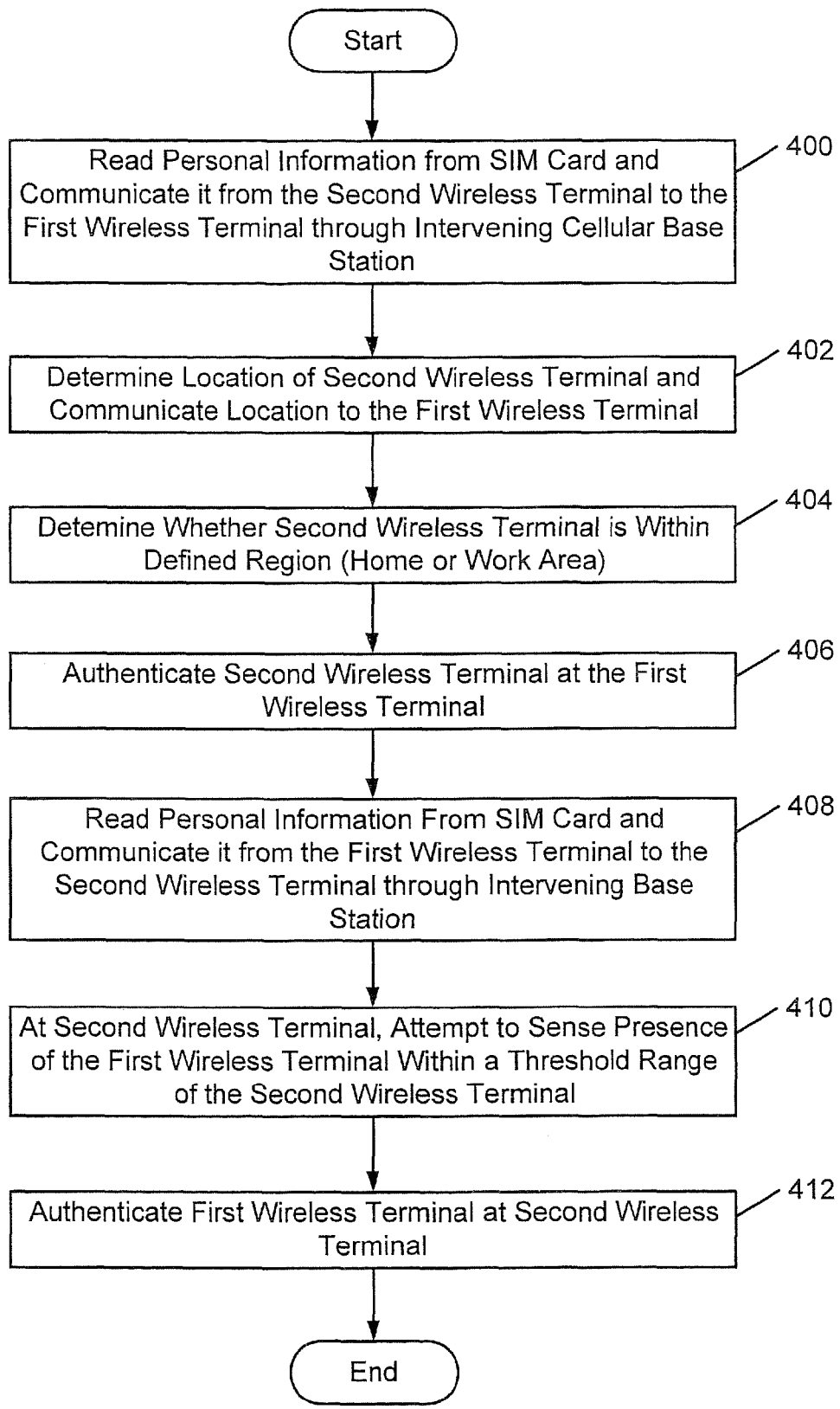
FIG. 4 is a flow chart that illustrates methods of establishing a collaborative domain among a plurality of communication terminals in response to authentication based on personal information read from a removable memory card in a communication terminal and geographic location of the communication terminal according to some embodiments of the present invention.

FIG. 4 is a flow chart that illustrates methods of establishing a collaborative domain among a plurality of communication terminals in response to authentication based on personal information read from a removable memory card in a communication terminal and geographic location of the communication terminal according to some embodiments of the present invention. A second wireless terminal reads personal information from a SIM card therein (Block 400) and communicates that information to a first wireless terminal through at least one intervening cellular base station. The second wireless terminal determines its location and communicates that location to the first wireless terminal (Block 402). A decision is made (Block 404) as to whether the second wireless terminal is within a defined region (e.g., home or work area). The first wireless terminal authenticates the second wireless terminal (Block 406) in response to the personal information from the second wireless terminal and the decision (Block 404) as to whether the second wireless terminal is within the defined region. The first wireless terminal reads personal information from a SIM card therein and communicates that information to the second wireless terminal through the at least one intervening base station (Block 408). The second wireless terminal then attempts to sense the presence of the first wireless terminal (Block 410) to determine whether the first and second terminals are within a threshold range of one another. The second wireless terminal authenticates the first wireless terminal (Block 412) in response to the personal information from the first wireless terminal and the attempt to sense the present of the first wireless terminal (Block 410) to determine whether the first and second wireless terminal are within a threshold range of one another.

A collaborative domain may then be established between the first and second terminals in response to the authentications carried out by both terminals. In this manner, the first and second terminals can utilize a long range indirect communication interface, such as a cellular interface, to mutually exchange personal information. The first terminal can use that same long range indirect communication interface to determine whether the second terminal is within a defined region and based on received personal information. The second terminal can use a short range direct communication interface to determine whether the first and second terminals are within a threshold range of one another. As described above, such position/range dependent authentication may allow a more flexible determination of when a user is authorized and/or available for inclusion in a collaborative domain and when an application program and/or data may be communicated from one terminal to another.

Figure 5:
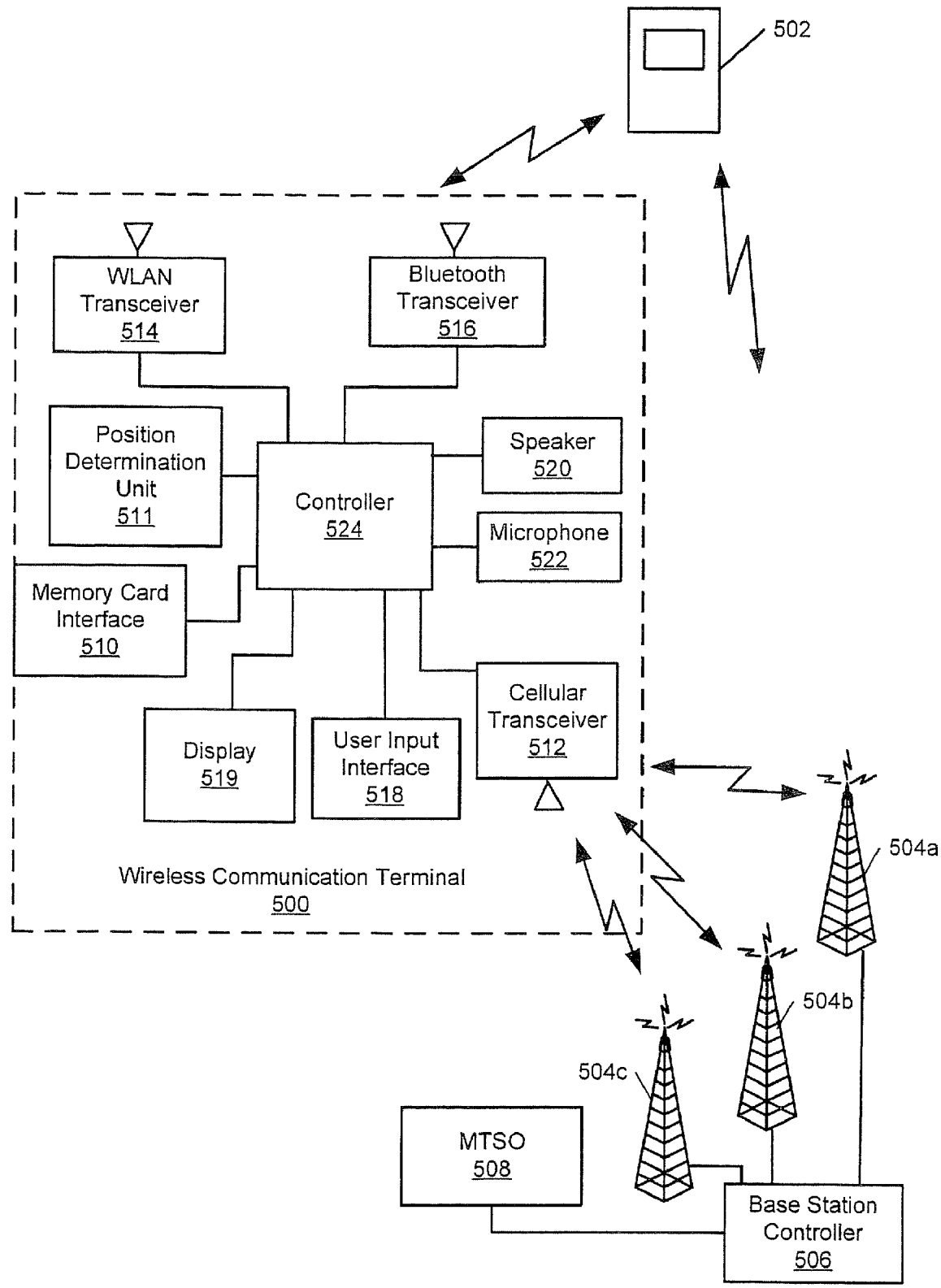
FIG. 5 is a block diagram of a collaborative domain and which illustrates in further detail an exemplary wireless communication terminal according to some embodiments of the present invention.

FIG. 5 is a block diagram of a collaborative domain and which illustrates in further detail an exemplary wireless communication terminal 500, which may be suitable for use as one or more the terminals 102-108 of FIG. 1, according to some embodiments of the present invention. The wireless terminal 500 communicates over a wireless air interface with another wireless terminal 502 through a direct communication link therebetween using a Bluetooth and/or WLAN protocol, and through an indirect communication link via one or more cellular base station transceivers 504*a-c*. The cellular base station transceivers 504*a-c* can be controlled by a base station controller 506 and a mobile terminal switching office (MTSO) 508 as is well known in the art.

The wireless terminal 500 may include a memory card interface 510, a position determining unit 511, a cellular transceiver 512, a WLAN transceiver 514, a Bluetooth transceiver 516, a user input interface 518 (e.g., keypad, keyboard, touch screen), a speaker 520, and a microphone 522 which can interface to, and be controlled by, a controller 524. The memory card interface 510 is configured to receive, and communicate with, a removable memory card, such as one or more of the memory cards described above, to read/write personal information therefrom. The position determination unit 511 is configured to determine the location of the wireless terminal 500 using one or more of the techniques described above, such as by triangulation of GPS signals from GPS satellites (120 in FIG. 1), by triangulation of cellular signals from the cellular base stations 504*a-c*, and/or by querying the MTSO 508 which can be configured to determine the location of the terminal 500 by triangulation of signals received therefrom by the base stations 504*a-c*. The controller may include, but is not limited to, a general purpose processor and/or a digital signal processor.

The cellular transceiver 512 can be configured to communicate with the other terminal 502 using one or more cellular communication protocols that can include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection.

The WLAN transceiver 514 can be configured to communicate with the other terminal 502 using one or more cellular communication protocols that can include, but are not limited to 802.11a, 802.11b, 802.11e, 802.11g, 802.11i, WiFi and/or other wireless local area network protocols. The Bluetooth transceiver 516 can be configured to communicate with the other terminal 502 using a Bluetooth communication protocol.

The controller 524 can be configured to read personal information from a memory card through the memory card interface 510, to determine its location via the position determination unit 511, and to communicate the personal information and/or the determined location to the other terminal 502 via the cellular transceiver 512, the WLAN transceiver 514, and/or the Bluetooth transceiver 516. The controller 524 can also be configured to receive personal information and/or the location of the other terminal 502 via the cellular transceiver 512, the WLAN transceiver 514, and/or the Bluetooth transceiver 516 and to authenticate the other terminal 502 in response to the received personal information and/or the location of the other terminal 502. The controller 524 can selectively establish a collaborative domain with the other terminal 502 through which user and/or program information can be exchanged therewith in response to the authentication of the other terminal 502. The controller 524 may be further configured to carry out one or more other functions described herein for establish a collaborative domain with one or more communication terminals.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A communication system comprising:
first and second communication terminals, wherein the first communication terminal carries out an authentication process for the second communication terminal by communicating with the second communication terminal through a base station transceiver to receive personal information from the second communication terminal that is defined within the second communication terminal, and by authenticating the second communication terminal in response to the received personal information and in response to determining that the second communication terminal is within a defined geographic range of the first communication terminal when the first communication terminal can sense the presence of the second communication terminal through an attempted establishment of a direct point-to-point communication interface between the first and second communication terminals, and
wherein the first communication terminal enables communication of at least one of user and program information, which is unrelated to authentication, to the second communication terminal in response to the authentication by the first communication terminal.

2. The communication system of claim 1, wherein:
the second communication terminal carries out an authentication process for the first communication terminal by communicating with the first communication terminal through the base station transceiver to receive personal information from the first communication terminal that is defined within the first communication terminal, and by authenticating the first communication terminal in response to the received personal information and in response to determining that the first communication terminal is within a defined geographic range of the second communication terminal when the second communication terminal can sense the presence of the first communication terminal through an attempted establishment of a direct point-to-point communication interface between the second and first communication terminals; and the first and second communication terminals respond to the authentication of the second communication terminal by the first communication terminal and the authentication of the first communication terminal by the second communication terminal by enabling communication of at least one of user and program information between the first and second communication terminals.

3. The communication system of claim 1, wherein:
the base station transceiver comprises a cellular base station transceiver;
the first and second communication terminals each comprise a cellular communication transceiver and further comprise at least one of a wireless local area network transceiver and a Bluetooth transceiver;
during the authentication of the second communication terminal by the first communication terminal, the second communication terminal communicates the personal information through its cellular communication transceiver and the base station transceiver to the first communication terminal, and the first communication terminal determines whether it can sense the presence of the second communication terminal utilizing at least one of a wireless local area network protocol through its wireless local area network transceiver and a Bluetooth communication protocol through its Bluetooth transceiver.

4. The communication system of claim 1, wherein:
the first communication terminal is further configured to authenticate the second communication terminal based on determining whether the second communication terminal is within at least one of a geographic region defined for a user's house, work place, and another known location where the user is at least one of authorized and available for inclusion in a collaborative domain with the first communication terminal.

5. The communication system of claim 4, wherein:
the second communication terminal is further configured to determine its geographic location based on at least one of triangulation of GPS signals from a constellation of GPS satellites and based on triangulation of cellular signals from a plurality of cellular base stations, and to communicate the determined geographic location to the first communication terminal.

6. The communication system of claim 5, wherein:
the second communication terminal is further configured to communicate the determined geographic location to the first communication terminal through the base station transceiver via a cellular communication protocol.

7. The communication system of claim 5, wherein:
the first and second communication terminals each comprise at least one of a wireless local area network transceiver and a Bluetooth transceiver; and
the second communication terminal is further configured to communicate the determined geographic location to the first communication terminal through at least one of the wireless local area network transceiver and the Bluetooth transceiver.

8. The communication system of claim 1, wherein:
the first communication terminal communicates an application program to the second communication terminal in response to the authentication of the second communication terminal by the first communication terminal.

9. The communication system of claim 8, wherein:
the second communication terminal comprises at least one of a laptop computer, tablet computer, personal data assistant, and other mobile computing device; and
the first communication terminal comprises a file storage server device.

10. A communication system comprising:
a first communication terminal comprising a removable memory card containing personal information, wherein the first communication terminal reads the personal information from the removable memory card and communicates the personal information to the second communication terminal through a base station transceiver;

a second communication terminal comprising a removable memory card containing personal information, wherein the second communication terminal authenticates the first communication terminal in response to the personal information received from the first communication terminal through the base station transceiver and, in response to determining that the first communication terminal is within a defined geographic range of the second communication terminal when the second communication terminal can sense the presence of the first communication terminal through an attempted establishment of a direct point-to-point communication interface between the first and second communication terminals, the second communication terminal reads the personal information from its removable memory card and communicates the personal information to the first communication terminal through the base station transceiver, wherein the first communication terminal authenticates the second communication terminal in response to the personal information received from the second communication terminal through the base station transceiver and in response to determining that the second communication terminal is within a defined geographic range of the first communication terminal when the first communication terminal can sense the presence of the second communication terminal through an attempted establishment of a direct point-to-point communication interface between the first and second communication terminals, and the first and second communication terminals enable communication of at least one of user and program information, which is unrelated to authentication, between the first and second communication terminals in response to the authentication by the first and second communication terminals.

11. The communication system of claim 10, wherein:
the removable memory card containing personal information in each of the first and second communication terminals comprises a removable SIM card.

12. The communication system of claim 10, wherein:
the first and second communication terminals each comprise a cellular communication transceiver, wherein the first and second communication terminals communicate the personal information therebetween through their cellular communication transceivers via the base station transceiver.

13. The communication system of claim 10, wherein:
the first and second communication terminals each initiate the reading of the personal information from their removable memory cards, communication of the respective personal information between the first and second communication terminals, and authentication of one another in response to occurrence of a scheduled time of day event.

14. The communication system of claim 10, wherein:
the first and second communication terminals each initiate the reading of the personal information from their removable memory cards, communication of the respective personal information between the first and second communication terminals, and authentication of one another in response to the first communication terminal receiving a message from the second communication terminal through the intervening base station transceiver.

15. The communication system of claim 10, wherein:
the first communication terminal comprises a display device, and the first communication terminal displays information, which is generated by an application hosted by the second communication terminal and received by the first communication terminal through the point-to-point communication interface, on the display device in response to the authentication by the first communication terminal of the second communication terminal.

16. The communication system of claim 10, wherein:
the first communication terminal hosts an application that receives data from the second communication terminal through the point-to-point communication interface, wherein the data that is received from the second communication terminal is generated by a user interface of the second communication terminal.

17. A communication system comprising:
first and second communication terminals, wherein the first communication terminal determines the geographic location of the second communication terminal and authenticates the second communication terminal in response to both the determined geographic location and personal information that is defined in the second communication terminal and is received by the first communication terminal from the second communication terminal, and wherein the first communication terminal enables communication of at least one of user and program information, which is unrelated to authentication, to the second communication terminal in response to the authentication by the first communication terminal.

* * * * *